United States Patent

[11] 3,591,966

| | | |
|---|---|---|
| [72] | Inventor | Nathaniel B. Kell<br>Indianapolis, Ind. |
| [21] | Appl. No. | 885,886 |
| [22] | Filed | Dec. 17, 1969 |
| [45] | Patented | July 13, 1971 |
| [73] | Assignee | General Motors Corporation<br>Detroit, Mich. |

[54] FLUID-COOLING SYSTEM
6 Claims, 2 Drawing Figs.

[52] U.S. Cl. ............................................. 60/54,
60/DIG. 3, 60/DIG. 5
[51] Int. Cl. ............................................. F16d 33/00
[50] Field of Search ............................... 60/54, DIG. 3, DIG. 5

[56] References Cited
UNITED STATES PATENTS
1,910,697  5/1933  Kiep ........................... 60/DIG. 5
2,638,746  5/1953  Kelley ......................... 60/54

*Primary Examiner*—Edgar W. Geoghegan
*Attorneys*—Warren E. Finekn, A. M. Heiter and John P. Moran ABSTRACT: A transmission having a torque converter drive and an alternate mechanical drive between the transmission input and output members where the torque converter, during converter drive operation, provides a centrifugal pressure head between the fluid inlet to the operating chamber and the fluid outlet from the operating chamber for the circulation of the torque converter operating fluid and lubricating fluid through the labyrinth path of a heat exchanger. An impeller mechanism, secured to the continuously rotating inner race of a one-way clutch, provides the means for forcing said fluid through the torque converter passages, and thence through the heat exchanger during direct or "lockup" drive when the torque converter is inoperative.

INVENTOR
Nathaniel B. Kell
BY
John P. Moran
ATTORNEY

INVENTOR.
Nathaniel B. Kell
BY
John P. Moran
ATTORNEY

FLUID-COOLING SYSTEM

This invention relates to fluid-cooling systems and more particularly to an improved cooling system for cooling lubricating fluid and torque multiplication fluid for use in a transmission.

Fluid supplied by a fluid pump to a torque converter is pumped by the torque converter during torque converter drive through a cooling system, such as a water-cooled heat exchanger, wherein the fluid is cooled prior to recirculation through the torque converter. However, during direct or lockup drive, the torque converter is inoperative, and the fluid which is supplied by the fluid pump for lubrication purposes is no longer forced by the action of the torque converter through the cooler prior to entering the transmission.

Accordingly, an object of this invention is to provide a cooling system which is operative during all phases of transmission operations, for cooling the lubricating and torque multiplication fluid regardless of whether the torque converter is operative at any time.

A primary object of the invention is to provide improved means for forcing the fluid through a conventional heat exchanger-type fluid-cooling system during both converter drive and direct drive phases of transmission operation.

Another object of the invention is to provide a fluid-cooling system wherein fluid, supplied by a fluid pump for use by the torque converter and for entry into various lubricating areas of the transmission, is caused to flow through the torque converter circuit and thence through a cooler prior to recirculation in the cooled state independent of the operation of the torque converter pump.

A further object of the invention is to provide a fluid-cooling system wherein a fluid pump supplies fluid under pressure to a chamber located adjacent the torque converter and the inlet to a central lubricating passage of the transmission, wherein an impeller, secured to the continuously rotating portion of a conventional one-way clutch, operates in conjunction with a diffuser mechanism, to force the fluid through the torque converter circuit when the torque converter is not operating, and thence through a cooler and back to the inlet to the transmission.

These and other objects and advantages of the invention will become apparent when reference is made to the following description and accompanying drawings, wherein.

Figure 1:
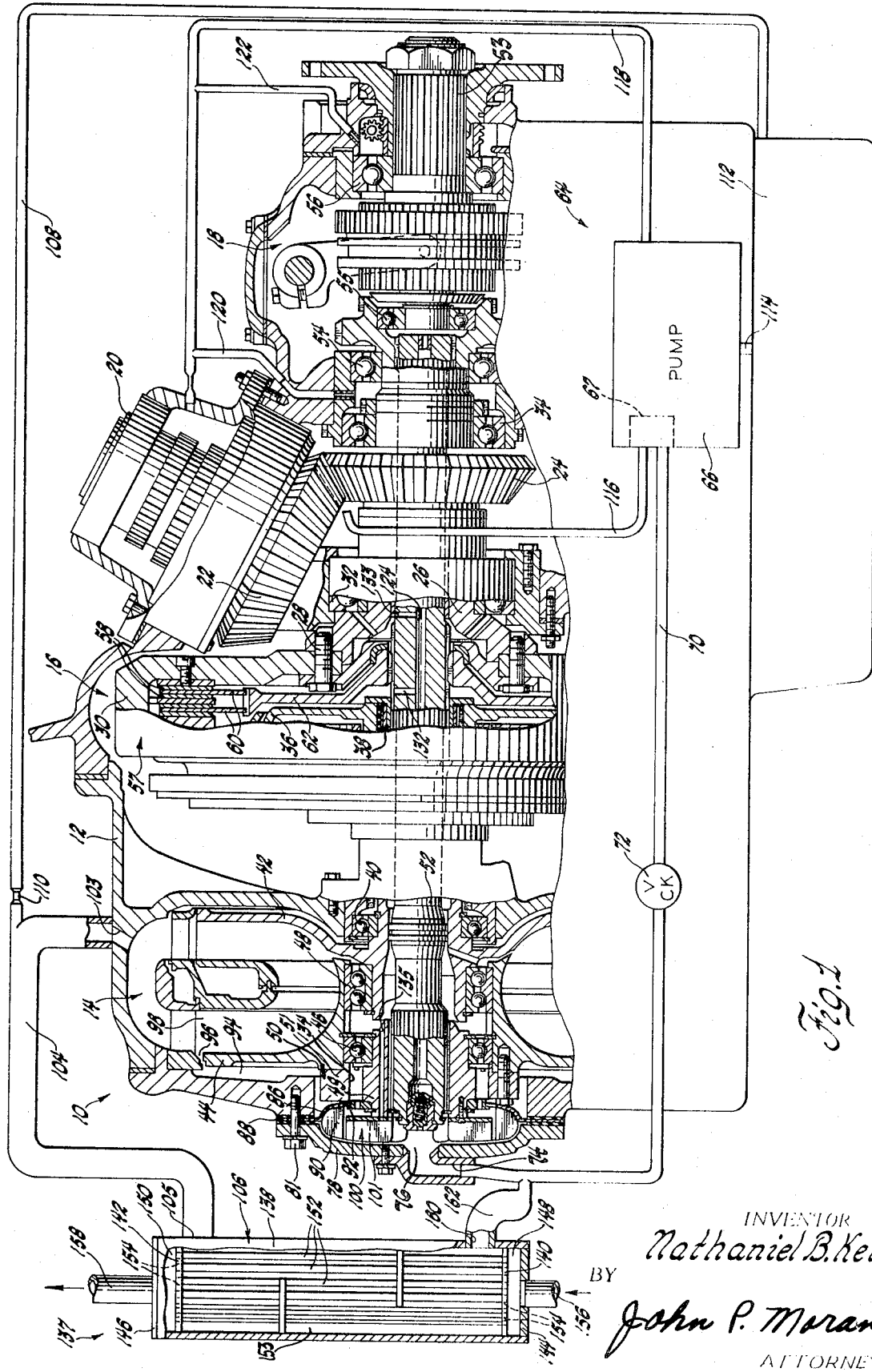
FIG. 1 is a cross-sectional view of a transmission embodying the invention.

Referring to the drawings in greater detail, the transmission assembly 10, illustrated in FIG. 1, includes a housing 12 having operatively mounted therein a stationary housing-type hydrodynamic torque converter unit 14, a clutching unit 16, and a manually controllable, slidable gear unit 18 adapted to provide forward direct drive, reverse reduction drive, or neutral or no drive.

A power input shaft 20 is connected by bevel gears 22 and 24 to a sleeve shaft 26 which is secured in any suitable manner, such as by bolts 28, to a clutch drum 30 of the clutching unit 16. The sleeve shaft 26 is rotatably supported on bearings 32 and 34. For converter drive, a converter drive clutch 36 is driven by the drum 30 in the manner described in U.S. Pat. No. 2,889,718, issued in the names of Schjolin et al., on June 9, 1959. The converter drive clutch 36 is splined to a converter input sleeve shaft 38 which is supported on bearings 40 and drives the pump 42 of the torque converter 14. The torque converter pump 42 hydrokinetically drives the converter turbine 44 which is rotatably supported on bearings 46 and 48 and connected through a one-way drive clutch 50 to the turbine output shaft 52, the inner race 49 of the clutch 50 being splined to the shaft 52 and the outer race 51 thereof being secured to the turbine 44. The turbine output shaft 52 is operatively connected by means of the forward and reverse gearing unit 18 to a final output or load shaft 53. As indicated in the patent, portions of the gearing unit 18 are rotatably supported on bearings 54 and 55, while the final output shaft 53 is supported on bearings 56, as well as on bearings 55.

For direct drive, a direct drive clutch unit 57, including discs 58 secured to the drum 30 and discs 60 secured to a clutch hub 62, is engaged in the manner described in the above-mentioned U.S. Pat. No. 2,889,718. Engagement of the discs 58 and 60 causes the drum 30 to drive the clutch hub 62 and to thereby directly drive the turbine output shaft 52 which is splined to the clutch hub 62, and the associated final output or load shaft 53, while bypassing the torque converter unit 14.

A lubricant supply system 64 supplies torque converter operating fluid and makeup fluid for that used to lubricate the transmission assembly 10, and includes a fluid pump 66 having a regulating valve 67 incorporated therein, and a passage 70 including a one-way check valve 72 permitting flow in a direction away from the fluid pump 66 and communicating between the fluid pump 66 and an inlet 74 into a chamber 76 formed under cover member 78 mounted on the inlet end of the transmission assembly 10.

Figure 2:
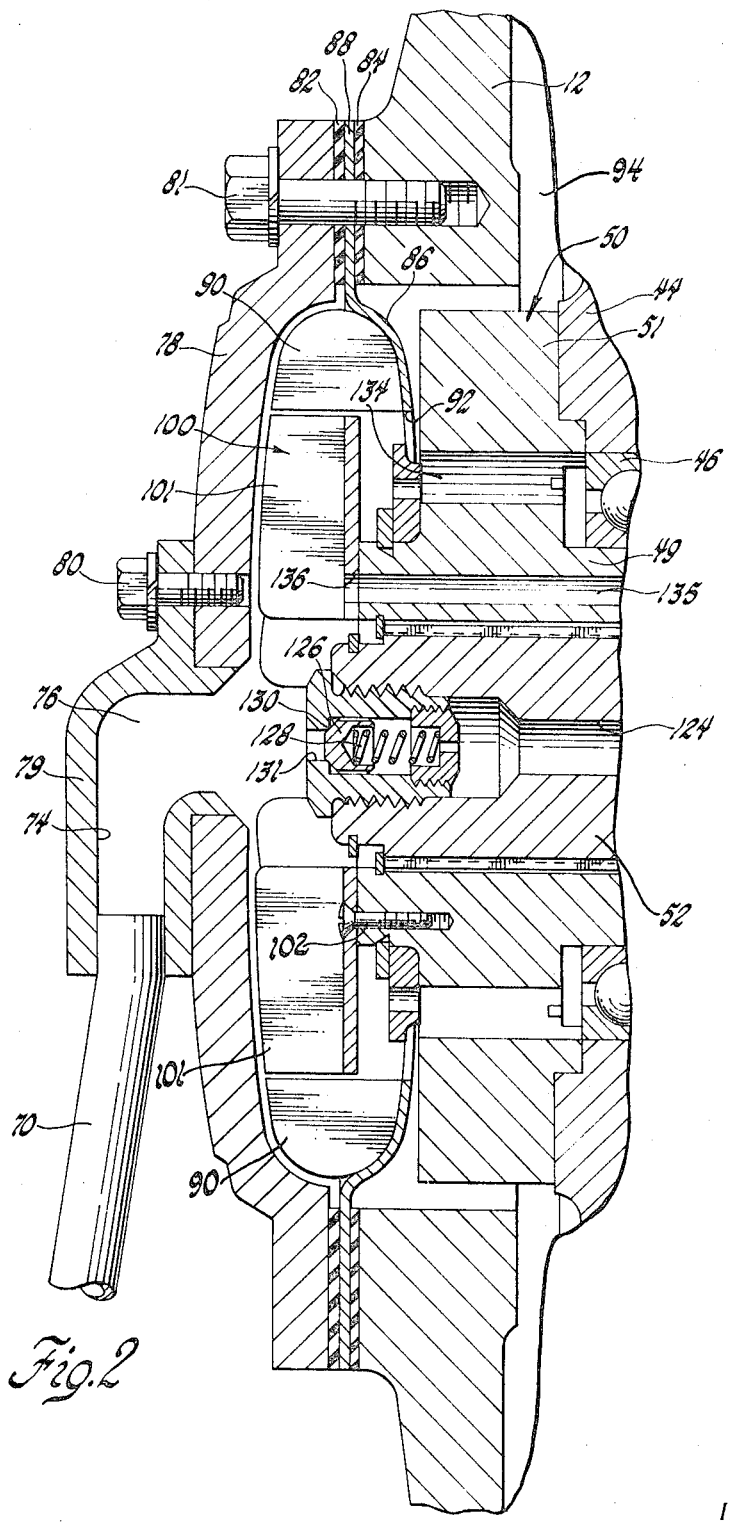
FIG. 2 is an enlarged fragmentary view of a portion of FIG. 1.

As better seen in FIG. 2, the inlet 74 is formed in a cap member 79 secured to the cover member 78 by bolts 80. The cover member 78, in turn, is secured to the transmission housing 12 by bolts 81. A pair of gaskets 82 and 84 are confined between the cover member 78 and a forward end face of the transmission housing 12. An annular diffuser member 86 is mounted at its outer-flanged edge 88 between the gaskets 82 and 84. The diffuser member 86 includes a plurality of diffuser vanes 90 located in fixed positions around the outer periphery of the chamber 76 permitting communication adjacent the innermost edges 92 of the vanes 90 with a passage 94 which communicates between the chamber 76 and an inlet 96 into the operating chamber 98 of the torque converter unit 14. An impeller 100, having a plurality of vanes 101 formed thereon, is secured by bolts 102 to the inner race 49 of the one-way drive clutch 50 for rotation with the turbine output shaft 52.

An outlet 103 from the torque converter unit 14 is formed in the transmission housing 12. When operative, the torque converter pump 42 provides a centrifugal pressure head between the fluid inlet 96 to the operating chamber 98 and the outlet 103 from the operating chamber 98.

A second line or conduit 104 communicates between the torque converter outlet 103 and an inlet port 105 formed in a heat exchanger 106. An exhaust passage or return line 108, including an air-bleed and fluid-flow restriction 110 for converter exhaust, communicates between the line 104 and a sump 112, the sump being connected to the fluid pump 66 by a line 114. Additional lines 116 and 118, and branch lines 120 and 122 communicate between the fluid pump 66 and the bevel gears 22 and 24, the power input shaft 20 and the bearings 34, 54 and 56. A central passage 124 is formed through the turbine output shaft 52, communicating between the chamber 76 formed in the converter end of the transmission housing 12 and the bearings 55.

A check valve 126 is urged by a spring 128 against a seat 130 formed adjacent a port 131 between the central passage 124 and the inlet chamber 76. The central passage 124 serves as an exhaust from the torque converter unit 14, along with the exhaust passage 108, and permits lubricant to flow from the chamber 76 to the bearing 55 in the slidable gear unit 18 and, via branch passages 132 and 133, to the discs or plates 58 and 60 of the direct drive clutch unit 57, and to the bearings 32 around the sleeve shaft 26.

The turbine 44 support bearings 46 and 48 are lubricated via a plurality of continually open passages 134 and 135, respectively, formed longitudinally through the clutch 50. The passages 134 and 135 communicate with the inlet chamber 76, the passages 135 communicating therewith via openings 136 formed in the impeller 100 and located at points intermediate the bolt 102 holes.

A lubricant-cooling system 137 includes the heat exchanger 106 having an outer casing 138 and headers or end support plates 140 and 142 secured within the casing 138 apart from end covers 144 and 146 of the heat exchanger 106, so as to form the chambers 148 and 150, respectively, therewith. A plurality of parallel tubes 152 are secured at their open ends to the headers or support plates 140 and 142, forming a labyrinth flow path or chamber 153 around their outer surfaces between the headers 140 and 142 and terminating in a plurality of openings 154 in each of the headers 140 and 142, permitting communication between the end chambers 148 and 150 through the tubes 152. A water inlet 156, from the radiator or engine-cooling system (not shown), is formed in the end cover 144, communicating with the chamber 148, and a water outlet 158 is formed in the other end cover 146 for returning the water to the radiator, the water flowing through the tubes 152 from the chamber 148 to the chamber 150.

The labyrinth flow path or chamber 153 provides communication between the inlet port 105 adjacent the header 142 and an outlet port 160 formed adjacent the opposite end header 140 within the heat exchanger casing 138. A conduit or line 162 communicates between the outlet port 160 and the conduit 70 for reentry into the inlet chamber 76.

OPERATION

Fluid is pumped from the sump 112 by the fluid pump 66 and supplied via the passage 70, the inlet 74, the chamber 76, past the radially innermost edges 92 of the diffuser vanes 90 into the passage 94 and thence to the inlet 96 to the torque converter unit 14. During torque converter drive, the torque converter pump 42 acts as a fluid-circulating pump and provides a centrifugal pressure head between the inlet 96 and the outlet 103, thereby pumping the fluid from the fluid inlet 96 through the torque converter operating chamber 98 and the torque converter outlet 103 and circulates the fluid via the second line or conduit 104 to the heat exchanger inlet port 105 and thence through the labyrinth flow path or chamber 153 to the heat exchanger outlet port 160 and the conduit or line 162 to the passage 70. This is the so-called "autoflow," serving to continuously cool the fluid while the torque converter unit 14 is in operation. The coolant, water from the radiator or engine cooling system (not shown), enters the end chamber 148 of the heat exchanger 106 via the water inlet 156, from whence it flows through the openings 154 into the parallel tubes 152, to the chamber 150 at the other end thereof, and thence to the outlet 158 for return to the engine radiator.

Some of the fluid supplied by the fluid pump 66 leaves the converter unit 14 circuit through the check valve 126 and the central passage 124 to lubricate the clutches 36 and 57 and the gearing unit bearing 55. Some fluid also will leave through the air-bleed and fluid-flow restriction 110 and return via the return line 108 to the sump 112. The fluid pump 66, thereupon, continually supplies a like volume of "makeup" fluid to the transmission inlet chamber 76 and torque converter unit 14 circuit.

When the transmission 10 is shifted to direct drive, the torque converter pump 42 is not driven and the converter turbine 44 is also not driven, since the one-way or freewheeling drive clutch 50 permits the turbine output shaft 52 to overrun the turbine 44. Hence, there is no autoflow or circulation provided by the stationary torque converter unit 14 through the heat exchanger 106 during direct or lockup drive. However, inasmuch as the impeller 100 is secured for continual rotation with a portion of the one-way drive clutch 50 and the turbine output shaft 52, it will serve as a centrifugal pump and, as such, impart a velocity and pressure to the fluid after entering the inlet chamber 76 from the fluid pump 66. The vanes 90 of the diffuser member 86 will prevent the fluid from leaving the impeller 100 tangentially and direct it around the radially inner edge 92 for entry into the passage 94. The pressure thus imparted to the fluid by the impeller 100 will propel the fluid through the torque converter circuit 96, 98, 103 and 104, and thence through the heat exchanger or cooler 106 and, after being thus cooled, back into the line 70 for recirculation through the transmission 10.

As indicated above, the fluid pump 66 also supplies fluid for lubrication purposes via the line 116 to the tooth contact area of the bevel gears 22 and 24, via the line 118 and branch lines 120 and 122 to the transmission bearings 34, 54 and 56, and to the power input shaft 20. It may be realized that the fluid in the sump 112 is maintained at a lower temperature by virtue of the heat exchanger 106 continually cooling the fluid prior to its return to the sump 112 and, thereby, limiting the heat rise throughout the system. Accordingly, any fluid in the lines 116 and 118 will already have been cooled and need not be channeled through the cooler 106 en route to the bevel gears, input shaft and various bearings, in order to function satisfactorily.

If desired, the diffuser member 86 may be mounted for rotation with the outer race 51 of the one-way drive clutch 50, and not confined at its outer edge between the cover member 78 and the transmission housing 12. As such, pumping action by the impeller 100 would be most effective when the clutch 50 is overrunning, i.e., during direct drive when the turbine 44 is stopped.

It should be apparent that the invention provides improved means for cooling all fluid supplied to a transmission by a fluid pump for both torque multiplication and lubrication purposes, independent of the operation of the torque converter, thereby eliminating the possibility of heating problems during direct drive.

While but one general embodiment of the invention has been shown and described, other modifications thereof are possible.

I claim:

1. In a transmission; an input and an output; heat exchanger means having a fluid inlet and a fluid outlet with a fluid-cooling passage therebetween; drive means connecting said input and output including torque converter drive means having a fluid-operating chamber with an inlet port connected to said fluid outlet, and an outlet port connected to said fluid inlet and an exhaust port to exhaust fluid from said torque converter drive means, and selectively operable to provide a drive between said input and output and during such drive to circulate operating fluid in said chamber from said inlet port to said outlet port and through said cooling passage from said fluid inlet to said fluid outlet and thence to said inlet port; additional drive means selectively operable to provide another drive between said input and output bypassing and relieving said torque converter drive means of said torque converter drive; and source means receiving fluid from said exhaust port and delivering fluid under pressure to said inlet port for said circulation by said torque converter drive means; and impeller means operatively connected to said output adjacent said inlet port for forcing said fluid received from said source means through said cooling passage while said additional drive means is operable.

2. A transmission comprising an input, an output, a first torque-transmitting means including a torque converter for at times connecting said input to said output, said torque converter including an inlet, an outlet and an exhaust, a second torque-transmitting means including mechanical means for at times directly connecting said input to said output, a heat exchanger, first and second ports formed in said heat exchanger at opposite ends thereof, a plurality of tubes in said heat exchanger forming a labyrinth path around the outside surfaces of said tubes between said first and second ports, a fluid pump for supplying fluid under pressure through a first passage to said inlet to said torque converter, a second passage between said first port and said outlet from said torque converter, and a third passage between said second port and said inlet into said torque converter, said torque converter when operative providing a centrifugal pressure head between said inlet and said outlet for recirculating said fluid through said heat exchanger, impeller means adjacent said inlet and operatively connected to said output for imparting a centrifugal pressure to said fluid for recirculating said fluid through said heat exchanger when said torque converter is inoperative, and said fluid pump supplying makeup fluid at all times to replace fluid flowing through said exhaust.

3. A fluid-cooling system for use in a transmission having a power input shaft, an output shaft, an intermediate shaft for transmitting torque from said power input shaft to said output shaft, first torque-transmitting means for at times connecting said intermediate shaft to said power input shaft through one torque path, second torque-transmitting means for at times connecting said intermediate shaft to said power input shaft through a second torque path, said cooling system comprising a fluid torque converter, said fluid torque converter being operable in only one of said torque paths, a water-cooled heat exchanger, an impeller operatively connected to said intermediate shaft for rotation therewith, fluid pump means for supplying fluid under pressure to said torque converter for torque multiplication use thereby when said torque converter is inoperative, and at all times to said transmission for lubrication purposes regardless of which torque path is operative, said torque converter when operative and said impeller at all times serving as centrifugal pumps to pump said fluid to said heat exchanger, said heat exchanger serving to cool said fluid received under pressure from said torque converter and said impeller prior to reentry into said transmission.

4. A fluid-cooling system for use in a transmission having a power input shaft, an output shaft, an intermediate shaft for transmitting torque from said power input shaft to said output shaft, first torque-transmitting means for at times connecting said intermediate shaft to said power input shaft through one torque path, second torque-transmitting means for at times connecting said intermediate shaft to said power input shaft through a second torque path, said cooling system comprising a fluid torque converter, said fluid torque converter being operable in one of said torque paths, a water-cooled heat exchanger, an inlet into said fluid torque converter, impeller means adjacent said inlet mounted for rotation with said intermediate shaft; and fluid pump means for supplying fluid under pressure to said torque converter for torque multiplication and lubrication purposes when said torque converter is operative and to said impeller for lubrication purposes when said torque converter is inoperative, said torque converter when operative and said impeller at all times causing said fluid to flow through said heat exchanger, said heat exchanger serving to cool all of said fluid received under pressure from said impeller and said torque converter prior to reentry into said transmission.

5. A fluid-cooling system for use in a transmission having a power input shaft, a shiftable gear unit, an intermediate shaft for transmitting torque from said power input shaft to said gear unit, first torque-transmitting means including a first clutch for at times connecting said intermediate shaft to said power input shaft through one torque path, second torque-transmitting means including a second clutch for at times connecting said intermediate shaft to said power input shaft through a second torque path, said cooling system comprising a fluid torque converter, said fluid torque converter being operable in one of said torque paths, an impeller rotatable by said intermediate shaft and located downstream of said torque converter, a heat exchanger, means for flowing water through said heat exchanger, fluid pump means for supplying fluid under pressure to said impeller and said torque converter, first passage means communicating between said fluid pump means and said impeller, second passage means communicating between said impeller and said torque converter for supplying fluid thereto for torque multiplication purposes when said torque converter is inoperative, third passage means communicating from said torque converter through said heat exchanger to said first passage means, said torque converter pumping said fluid through said third passage means when operative and said impeller pumping said fluid through said torque converter and said third passage means when said torque converter is inoperative, fourth passage means formed axially through said intermediate shaft and communicating between said second passage means and said first and second clutches and said shiftable gear unit for lubrication thereof throughout all transmission operations, and one-way check valve means for controlling fluid flow into said fourth passage means from said first passage means, the fluid being cooled by said water in said heat exchanger prior to reentry into said first passage means.

6. The system described in claim 5, and a sump operatively connected to said fluid pump means, and fifth passage means for returning said cooled fluid to said sump.